United States Patent

Shimoda et al.

[11] Patent Number: 5,518,791
[45] Date of Patent: May 21, 1996

[54] HIGH-HARDNESS TRANSPARENT POLYESTER MOLDINGS

[75] Inventors: Akehide Shimoda; Shigeru Nezu; Mineo Ohtake, all of Fuji, Japan

[73] Assignee: Polyplastics Co., Ltd., Japan

[21] Appl. No.: 280,206

[22] Filed: Jul. 25, 1994

[30] Foreign Application Priority Data

Jul. 27, 1993 [JP] Japan .................................. 5-184822

[51] Int. Cl.$^6$ ............................ B29D 22/00; B32B 27/06
[52] U.S. Cl. ...................... 428/36.2; 428/480; 428/483; 428/918
[58] Field of Search ................................. 428/480, 483, 428/36.2; 264/73, 532, 544, 572

[56] References Cited

U.S. PATENT DOCUMENTS 4,261,473  4/1981  Yamada et al. ........................ 428/480
5,258,230  11/1993  LaFleur ................................. 428/483

Primary Examiner—P. C. Sluby
Attorney, Agent, or Firm—Nixon & Vanderhye

[57] ABSTRACT

A molding having a high transparency and a surface hardness of B or higher in terms of pencil hardness, is provided by blow molding process employing no orientation step. A high-hardness transparent polyester molding, obtained by quenching and carrying out non-orientation blow molding of a polyester resin or a composition thereof in a molten state, and subsequent crystallization thereof in a specific temperature range.

9 Claims, 1 Drawing Sheet

HIGH-HARDNESS TRANSPARENT POLYESTER MOLDINGS

FIELD OF THE INVENTION

The present invention relates to a polyester molding, and more particularly to a molding having high transparency and a surface hardness of B or higher in terms of pencil hardness.

BACKGROUND OF THE INVENTION

Recently, a saturated polyester resin such as polyethylene terephthalate has been increasingly used as a transparent resin in place of vinyl chloride resin due to the environmental problems etc. However, since the saturated polyester resins are generally crystalline resins, and it has been difficult to crystallize them in transparent condition without using a complicated process such as orientation, those excellent characteristics including high hardness and chemical resistance which are provided by the crystallization can hardly be enjoyed according to a blow molding process wherein no orientation step is employed.

SUMMARY OF THE INVENTION

As a result of extensive research carried out in order to solve the above-mentioned problem, the inventors came up with the present invention, by finding out that a molding which is transparent, resistant to chemicals and has high surface hardness can be provided by molding crystalline polyester resin compositions followed by carrying out heat-treatment.

Accordingly, the present invention is to provide a high-hardness transparent polyester molding which is obtained by quenching and carrying out non-orientation blow molding of a polyester resin or a composition thereof in a molten state, and subsequent crystallization thereof in the range of temperature defined by the following formula (1);

$$Tcc \leq T1 \leq Tm-1 \, (°C.) \quad \text{formula (1)}$$

wherein Tcc is the cold crystallization temperature (°C.) of the resin as measured at a heating rate of 10° C./min by differential thermal analysis in accordance with JIS K7121 and Tm is the melting point (°C.) of the resin as measured at a heating rate of 10° C./min by differential thermal analysis in accordance with JIS K 7121, the polyester molding having a surface hardness of B or higher in terms of pencil hardness, and a transparency in the range defined by the following formula (2);

$$Tt \geq 80\% \quad \text{formula (2)}$$

(wherein, Tt is the total light transmittance in accordance with ASTM D1003).

The crystalline polyester resin composition according to the present invention includes polyethylene terephthalate, polybutylene terephthalate, and a copolyester obtained by replacing a part of the terephthalic acid component thereof with a component made of one or more other bifunctional carboxylic acid such as an aromatic dicarboxylic acid including isophthalic acid, naphthalene dicarboxylic acid, diphenyl dicarboxylic acid, diphenoxy ethane dicarboxylic acid, diphenyl ether dicarboxylic acid, diphenyl sulfone dicarboxylic acid, an alicyclic dicarboxylic acid such as hexahydroterephthalic acid, hexahydroisophthalic acid, an aliphatic dicarboxylic acid such as adipic acid, sebatic acid and azelaic acid, an oxy acid such as p-b-hydroxy ethoxy benzoic acid p-oxybenzoic acid, oxycaproic acid, and/or by replacing a part of the ethylene glycol component or the tetramethylene glycol component with a component made of one or more other glycols such as tetramethylene glycol, ethylene glycol, trimethylene glycol, hexamethylene glycol, decamethylene glycol, neopentylene glycol, diethylene glycol, 1,1-cyclohexane dimethylol, 1,4-cyclohexane dimethylol, 2,2-bis(4-b-hydroxy ethoxy phenyl)propane, and bis(4-b-hydroxy ethoxy phenyl)sulfone. The crystalline polyester resin composition can be a mixture of two or more such resins.

T2 (Tc–Tcc) of the crystalline polyester resin or the composition thereof is preferably in the range of the condition defined by the following formula (3);

$$5 \leq T2 \leq 35 \, (°C.) \quad \text{formula (3)}$$

wherein T2=Tc–Tcc (°C.), Tc is the crystallization temperature (°C.) of the resin as measured at a rate of temperature drop of 10° C./min by differential thermal analysis in accordance with JIS K 7121, and Tcc is the cold crystallization temperature (°C.) of the resin as measured at a rate of temperature drop of 10° C./min by differential thermal analysis in accordance with JIS K 7121.

When T2 is lower than 5° C., the crystallization effect by the heat treatment is decreased, and when it is higher than 35° C., the high crystallization speed makes it difficult to obtain a transparent molding.

The molding of the polyester resin composition is carried out by non-orientation blow molding process. In order to improve the moldability, another thermoplastic resin can be used as an interlayer. For the molding, a mold having a temperature lower than the cold crystallization temperature (Tcc) of the outer-most layer's crystalline polyester resin composition is used, and the outer-most layer's crystalline polyester resin composition is quenched to make the surface layer amorphous or a low crystalline condition, to result in a transparent polyester resin composition. When the mold temperature is higher than Tcc, the polyester resin is crystallized, and transparency cannot be obtained.

The molding is then heat-treated in a temperature range defined by the above-mentioned formula (1) to be crystallized, so that a molding having both high surface hardness and transparency can be provided. When T1 is lower than Tcc, the crystallization can not be progressed and the surface hardness is not improved. When T1 is higher than Tm–2, the surface is melted during the heat-treatment to degrade the outlook.

The composition of the present invention can contain another plastic, a filler, as well as another additive such as antioxidant, a colouring agent, a light stabilizer, a nucleating agent, a flame retarding agent, a flame retarding assistant, a plasticizer, an antistatic agent, a surfactant and a lubricant in such an amount that the purpose of the present invention is not disturbed.

As described above, the molding obtained according to the present invention has the following excellent advantages.

A complicated step such as orientation is not required, and the molding can be carried out easily, and the resulting product has high transparency and high surface hardness of B or higher, the molding can be prevented from flaws during transportation, and the beautiful outlook can be maintained. Accordingly, the high-hardness transparent polyester molding of the present invention is advantageously used for such uses as containers, including food packing containers, and cosmetic packing containers.

BRIEF DESCRIPTION OF THE DRAWING

The figure shows a front view of a bottle produced by non-orientation blow molding according to the Embodiment.

In accompanying FIG. 1, the bottle is shown having a mouth 1 with a screw region 2 formed on the bottle's neck 3. The bottle is also shown having a shoulder 4, a body 5 and a bottom 6.

TABLE 1

Figure 1:
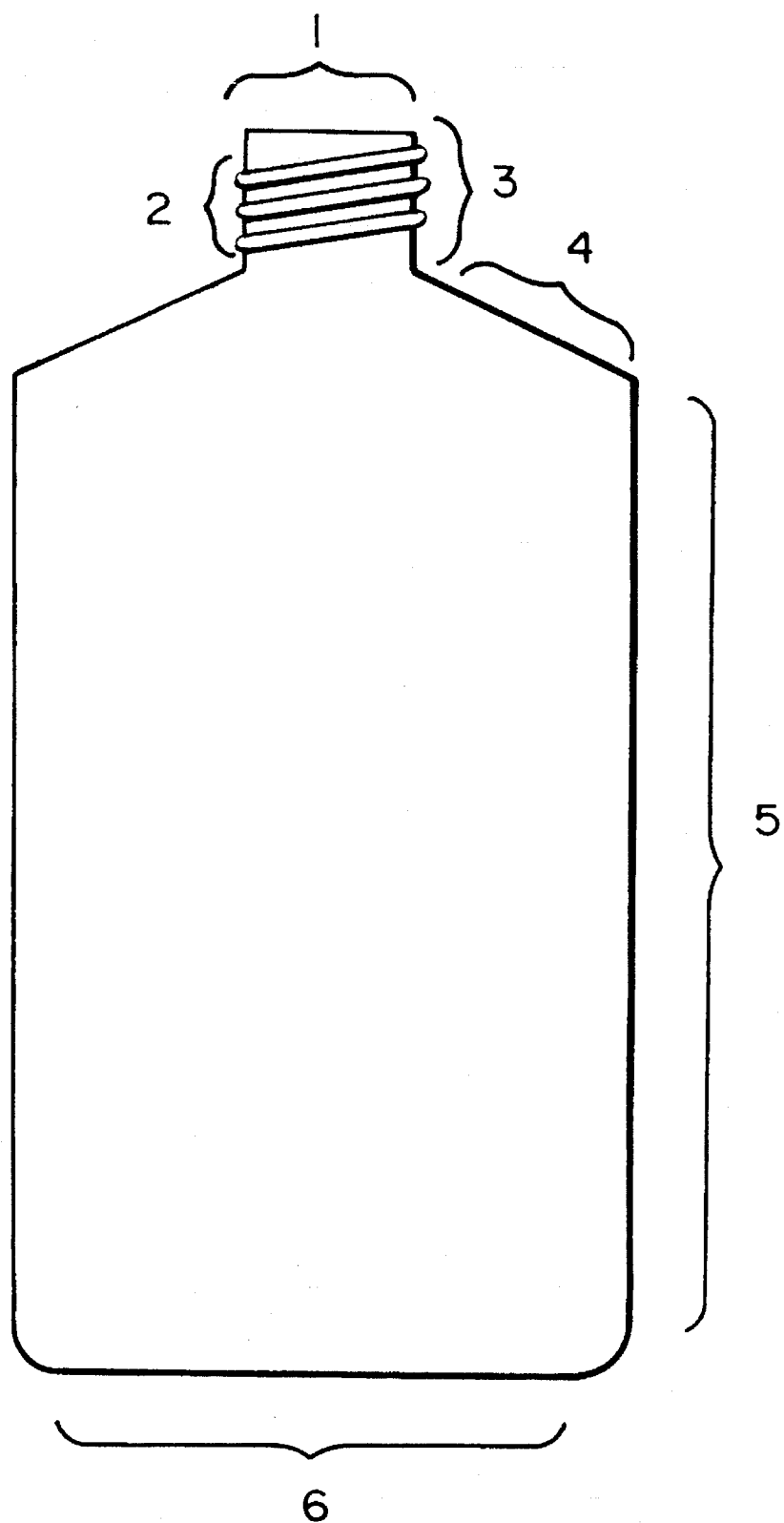

| Polymer | | A | B | C | D | E |
|---|---|---|---|---|---|---|
| Formulation (parts by weight) | PET | | | | 100 | |
| | m-PET*[1] | *30 | 20 | 50 | | |
| | PBT | | | | | 100 |
| | m-PBT*[2] | 70 | 80 | 50 | | |
| Tc (°C.) | | 125 | 114 | 125 | 168 | 180 |
| Tcc (°C.) | | 28 | 83 | —*[3] | 80 | 30 |
| Tc - Tcc (°C.) | | 28 | 31 | — | 88 | 150 |
| Tm (°C.) | | 225 | 225 | 225 | 225 | 225 |

*[1]m-PET: Bellpet IFG-8L produced by Kanebo, Ltd.
*[2]m-PBT: Modified PBT obtained by copolymerization by replacing 12 mol % of terephthalic acid component with isophthalic acid component
*[3]Measurement impossible

TABLE 2

| | | Embodiments | | Reference Examples | | | |
|---|---|---|---|---|---|---|---|
| | | 1 | 2 | 1 | 2 | 3 | 4 |
| Polymer | | A | B | A | C | D | E |
| Single-layer blow molding conditions | Resin temperature | 250° C. | 250° C. | 250° C. | 250° C. | 260° C. | 250° C. |
| | Mold temperature | 30° C. | 30° C. | 30° C. | 30° C. | 30° C. | 30° C. |
| | Resin thickness (body) | 600 μ | 600 μ | 600 μ | 600 μ | 600 μ | 60 μ |
| Multi-layer blow molding conditions | HDPE temperature | 200° C. | 200° C. | 200° C. | 200° C. | 200° C. | 200° C. |
| | Resin temperature | 250° C. | 250° C. | 250° C. | 250° C. | 260° C. | 250° C. |
| | Mold temperature | 30° C. | 30° C. | 30° C. | 30° C. | 30° C. | 30° C. |
| | HDPE thickness (body) | 700 μ | 700 μ | 700 μ | 700 μ | 700 μ | 700 μ |
| | Resin thickness (body) | 100 μ | 100 μ | 100 μ | 100 μ | 100 μ | 100 μ |
| Tc - Tcc (°C.) | | 28 | 31 | 28 | — | 88 | 150 |
| Treatment conditions T1 | | 110° C. × 1s | 110° C. × 1s | 80° C. × 5s | 140° C. × 1s | 110° C. × 1s | 110° C. × 1s |
| Tt (%) | | 89 | 90 | 88 | 89 | 55 | 60 |
| Surface hardness | | HB | B | 2B | 3B | B | HB |

EXAMPLES

To further illustrate this invention, and not by way of limitation, the following embodiments are given. Embodiments 1–2 and Reference Examples 1–4

A bottle having a volume of 200 ml, which is shown in FIG. 1 was produced by the use of polyester resin compositions of the formulations shown in Table 1, by single layer non-orientation blow molding and multi-layer non-orientation blow molding using HDPE (high-density polyethylene) as the inner layer under the conditions shown in Table 2. The bottles were evaluated on the following points and the results are shown in Table 2.

(1) Transparency

A body of the single layer non-orientation blow molding was cut out and measurement of Tt (Total light transmittance) was carried out in accordance with ASTM D1003.

(2) Surface hardness

A body of the multi-layer blow molding was cut out and pencil hardness was measured in accordance with JIS K5401.

We claim:
1. A high-hardness transparent blow-molded polyester article which is obtained by a process which comprises the steps of:
subjecting a molten crystalline polyester resin composition to quenching and non-orientation blow molding; and subsequently
crystallizing the blow-molded article by subjecting the article to a temperature range defined by the following formula (1):

$$Tcc \leq T1 \leq Tm-2 \text{ (°C.)}$$

wherein Tcc is the cold crystallization temperature (°C.) of the resin as measured at a heating rate of 10° C./min by differential thermal analysis in accordance with JIS K7121 and Tm is the melting point (°C.) of the resin as measured at a heating rate of 10° C./min by differential thermal analysis in accordance with JIS K7121, and wherein
the blow-molded polyester article has a surface pencil hardness of at least B, and a transparency in the range defined by the following formula (2):

$Tt \geqq 80\%$ wherein Tt is the total light transmittance in accordance with ASTM D1003.

2. The high-hardness transparent blow-molded polyester article as claimed in claim 1, wherein said step of non-orientation blow molding is practiced by blow-molding multiple thermoplastic resin layers such that the outer-most layer is formed of the crystalline polyester resin.

3. The high-hardness transparent blow-molded polyester article as claimed in claim 2, wherein said step of non-orientation blow molding is practiced by blow-molding multiple thermoplastic resin layers such that the outer-most layer is formed of the crystalline polyester resin and an inner-most layer of the article is formed of a thermoplastic resin other than the crystalline polyester resin.

4. The high-hardness transparent blow-molded polyester article as claimed in claim 1, in which said step of non-orientation blow-molding is practiced using a mold having a temperature at the time of blow-molding that is equal to or less than the cold crystallization temperature Tcc of the crystalline polyester resin.

5. The high-hardness transparent blow-molded polyester article as claimed in claim 1, in which the crystalline polyester resin has a temperature condition T2 which is in the range defined by the following formula (3):

$5 \leqq T2 \leqq 35$ (°C.)

wherein T2=Tc−Tcc (°C.), Tc is the crystallization temperature (°C.) of the resin as measured at a rate of temperature drop of 10° C./min by differential thermal analysis in accordance with JIS K7121, and Tcc is as previously defined.

6. A process for producing a high-hardness, transparent blow-molded polyester article comprising the steps of:
(a) subjecting a molten crystalline polyester resin composition to quenching and non-orientation blow-molding in a mold having a mold temperature at the time of blow-molding which is equal to or less than the cold crystallization temperature (Tcc) of the crystalline polyester resin composition to obtain a non-crystallized blow-molded preform of said article, and thereafter
(b) crystallizing the blow-molded preform of said article by subjecting the preform to a crystallization temperature within a range defined by the following formula (1):

$$Tcc \leqq T1 \leqq Tm-2 \text{ (°C.)} \qquad (1)$$

wherein Tcc is the cold crystallization temperature (°C.) of the resin as measured at a heating rate of 10° C./min by differential thermal analysis in accordance with JIS K7121 and Tm is the melting point (°C.) of the resin as measured at a heating rate of 10° C./min by differential thermal analysis in accordance with JIS K7121.

7. The process as in claim 1, wherein step (a) is practiced by blow-molding multiple thermoplastic resin layers such that the outer-most layer is formed of the crystalline polyester resin.

8. The process of claim 7, wherein step (a) is practiced by blow-molding multiple thermoplastic resin layers such that the outer-most layer is formed of the crystalline polyester resin and an inner-most layer of the article is formed of a thermoplastic resin other than the crystalline polyester resin.

9. The process of claim 6, in which the crystalline polyester resin has a temperature condition T2 which is in the range defined by the following formula (3):

$$5 \leqq T2 \leqq 35 \text{ (°C.)} \qquad (3)$$

wherein T2=Tc−Tcc (°C.), Tc is the crystallization temperature (°C.) of the resin as measured at a rate of temperature drop of 10° C./min by differential thermal analysis in accordance with JIS K7121, and Tcc is as previously defined.

* * * * *